July 12, 1932.  C. M. SEYMOUR  1,866,677
SHOCK ELIMINATING DEVICE
Filed Jan. 21, 1926
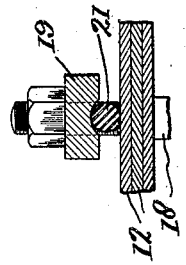
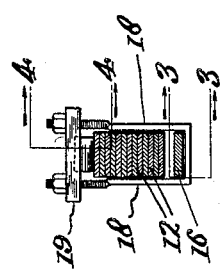
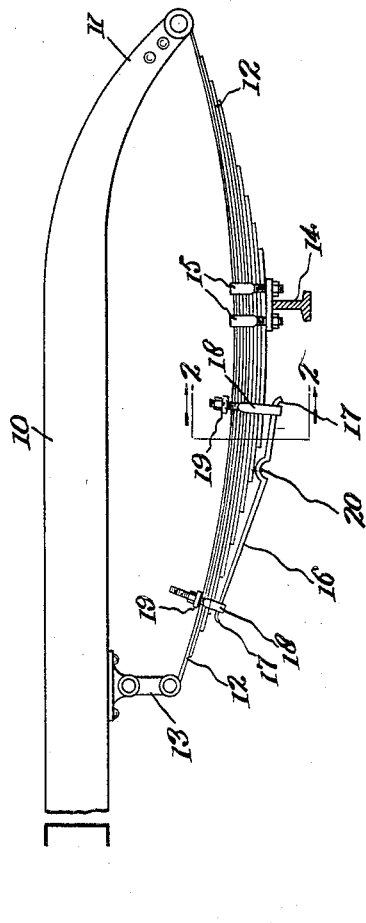
Inventor
Claude M. Seymour
By Mawhinney & Mawhinney
Attorneys.

Patented July 12, 1932

1,866,677

UNITED STATES PATENT OFFICE

CLAUDE M. SEYMOUR, OF ROANOKE, VIRGINIA

SHOCK ELIMINATING DEVICE

Application filed January 21, 1926. Serial No. 83,716.

The present invention relates to improvements in shock absorbing or eliminating devices, and more particularly to those which are applicable to springs to check the rebound thereof and prevent the excessive compression thereon; and thus effectually add to the comfort and handling of motor vehicles equipped with these devices under bad road conditions.

The primary object of this invention is to provide means whereby the rebound of two relative members, such as a spring and frame, may be checked but the compression of the two not materially affected.

Another object of the invention is to provide a simply constructed shock eliminating equipment of this character which may be readily installed upon motor vehicles and the like without changes in the design or construction of the same.

A further object of the invention is to provide a shock eliminating device of this character which is capable of adjustment to meet various requirements found in installation and use.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a fragmentary side elevation of a portion of a motor vehicle frame showing the spring and axle thereof, and equipped with the shock eliminating device of this invention.

Figure 2 is an enlarged transverse section taken through the same on the line 2—2 of Figure 1.

Figure 3 is a further enlarged section taken through one end of the device showing the supporting clip for holding the same in position, and Figure 4 is an enlarged detail section taken on the line 4—4 of Figure 2 showing the bearing and connecting means for the other end of the device.

Referring to the drawing, 10 designates the side bar of a vehicle frame provided at its end with the usual horn 11 to which one end of the usual leaf spring 12 is attached. The other end of the leaf spring 12 is connected by a shackle 13 to an intermediate portion of the frame bar 10. An axle 14 is secured by clips 15 to an intermediate portion of the spring 12, the axle 14 adapted to move toward and from the frame bar 10 by the flexing of the spring 12.

The present attachment is adapted to be mounted on the spring 12 at one end of the axle 14 and comprises a flat spring 16 having its opposite ends offset in one direction and arched or curved to provide seats 17 across which the closed ends of clips 18 are adapted to engage, the clips 18 embracing the spring 12 and provided with straps 19 in the usual manner for adjusting the clips and drawing the ends of the shock absorbing spring 16 toward the under side of the spring 12 to the desired extent, as shown in Figure 1.

One of the clips 18 is preferably located a short distance from the axle 14, while the outer clip 18 is positioned toward the outer end of the spring 12, the spring 16 being of sufficient length to extend over a considerable portion of the spring 12.

The shock absorbing spring 16 is provided intermediate its ends, and preferably toward the inner end thereof, with a camber 20 or an offset portion which provides not only spacing means between the springs 16 and 12, but also a fulcrum for the spring 16 upon which the latter may rock and flex. The camber 20 is adapted to bear against the lower side of the spring 12, so that the ends of the spring 16 are spaced from the spring 12 and may be drawn under the desired tension toward the spring 12 to serve as an auxiliary spring for reinforcing the spring 12 after the latter has been compressed, under rebound action, to a predetermined extent. It will be noted that the usual flexing of the spring 12 under ordinary load conditions is not interfered with to any extent as the spring 16 is spaced at its ends from the adjacent portions of the spring 12.

In order to prevent any binding or wedging action of the inner clip 18 upon the spring 12, a roller 21 is seated in a recess beneath the strap 19 of the inner clip 18 and the uppermost leaf of the spring 12. The roller 21 thus permits of a free shifting of the inner clip 18 to accommodate the bending and straightening of the spring 12, particularly when subjected to heavy load conditions. The seats 17 at opposite ends of the shock absorbing spring 16 prevent the creeping thereof out of engagement with the clips 18, while the camber 20 may of course shift against the lower side of the spring 12 to accommodate the springs 12 and 16 one to the other under varying conditions of flexing.

In operation, when the device is mounted on the spring 12 as shown in Figure 1, the outer clip 18 is tightened sufficient only to exert a pressure on the camber 20 for holding the spring 16 in place. When the spring 12 is compressed by the movement of the axle 14 toward the frame 10, or vice versa, there is a tendency for the auxiliary spring 16 to be released from tension as the spring 16 approaches a more or less straight line position. On the rebound, however, a greater pressure is exerted on the fulcrum or camber 20 on the auxiliary spring 16 and this creates an increased interleaf friction of the main spring 12 checking the rebound action of the same by pinching the several leaves of the spring 12 together. This action, added to the resistance offered by the auxiliary spring 16 effectively checks the rebound. By adjustment of the clips 18 it is thus apparent that the flexibility of the spring 12 may be varied during the operation of the spring and that the flexibility may also be adjusted to take care of different loads and different conditions met with in the different types of springs.

It is obvious that various changes and modifications may be made in the details of construction and design of the above specifically described embodiment of this invention without departing from the spirit thereof, such changes and modifications being restricted only by the scope of the following claims.

What is claimed is:—

1. A shock eliminating device for use in connection with leaf springs comprising a flat spring having a camber intermediate its ends providing a fulcrum for contact with the convex side of the leaf spring, adjustable clips mounted on the opposite ends of the flat spring for embracing the leaf spring at spaced points thereon, and anti-friction means carried by one of the clips for engaging the leaf spring to permit the shifting of the clip thereon incident to the variable movement between the leaf and flat springs.

2. A shock eliminating device for application to leaf springs comprising a flat spring having a camber intermediate its ends and seats at its opposite extremities, a clip mounted in each seat of the flat spring and adapted to engage the leaf spring, means for adjusting said clip to vary the tension of the flat spring against the leaf spring, and an anti-friction roller carried by one of said clips and engaging the leaf spring to permit free adjustment of the flat spring thereon.

In testimony whereof I affix my signature.

CLAUDE M. SEYMOUR.